United States Patent
Hsu et al.

(10) Patent No.: US 10,654,189 B2
(45) Date of Patent: May 19, 2020

(54) ALL-DIRECTIONAL PROFILING MACHINE

(71) Applicant: Chun Jen Hsu, Taichung (TW)

(72) Inventors: Chun Jen Hsu, Taichung (TW); Ying Cheng Wang, Taichung (TW)

(73) Assignee: Chun Jen Hsu, Taichung (TW)

( * ) Notice: Subject to any disclaimer, the term of this patent is extended or adjusted under 35 U.S.C. 154(b) by 270 days.

(21) Appl. No.: 15/861,864

(22) Filed: Jan. 4, 2018

(65) Prior Publication Data

US 2019/0202081 A1 Jul. 4, 2019

(51) Int. Cl.
| | |
|---|---|
| *B27C 5/06* | (2006.01) |
| *B23Q 1/48* | (2006.01) |
| *B23Q 1/52* | (2006.01) |
| *B23C 1/00* | (2006.01) |
| *B23Q 1/01* | (2006.01) |
| *B23C 1/12* | (2006.01) |

(52) U.S. Cl.
CPC ............... *B27C 5/06* (2013.01); *B23C 1/002* (2013.01); *B23C 1/12* (2013.01); *B23Q 1/012* (2013.01); *B23Q 1/4842* (2013.01); *B23Q 1/525* (2013.01); *Y10T 409/30896* (2015.01); *Y10T 409/308232* (2015.01); *Y10T 409/308288* (2015.01)

(58) Field of Classification Search
CPC .. B27C 9/00; B27C 9/005; B27C 9/02; B27C 5/00; B27C 5/02; B27C 5/04; B27C 5/06; B27C 1/00; B27C 1/005; B27C 1/007; B27C 1/02; B27C 1/12; B23Q 1/012; B23Q 1/48; B23Q 1/4842; B23Q 1/525; B23C 1/002; B23B 39/006; Y10T 409/20; Y10T 409/307728; Y10T 409/308288; Y10T 409/309576; Y10T 409/503936; Y10T 409/5082; Y10T 409/50902; Y10T 409/509184
USPC ....... 409/202, 212, 235, 201, 211, 216, 168, 409/224
See application file for complete search history.

(56) References Cited

U.S. PATENT DOCUMENTS

| | | | |
|---|---|---|---|
| 5,718,408 A * | 2/1998 | Lin | F16M 1/00 248/676 |
| 2003/0070727 A1* | 4/2003 | Stephens | B27C 9/00 144/1.1 |

* cited by examiner

*Primary Examiner* — Shelley M Self
*Assistant Examiner* — Fred C Hammers
(74) *Attorney, Agent, or Firm* — Rosenberg, Klein & Lee (57) ABSTRACT

An all-directional profiling machine has a foundation. A profiling device is disposed on the foundation. The profiling device swings leftward and rightward at the same height relative to the foundation. An upright post is disposed at one end of the profiling device and has a terminal portion extending upward. A workbench is pivotally connected to the terminal portion of the upright post. The workbench tilts vertically and swings horizontally relative to the upright post. Therefore, the all-directional profiling machine performs a multi-angle profiling cutting process without demounting a workpiece repeatedly such that the processing of oblique surfaces is quicker, simpler and more precise, so as to not only meet various requirements of different processing angles but also feature enhanced processing efficiency.

7 Claims, 7 Drawing Sheets

ALL-DIRECTIONAL PROFILING MACHINE

BACKGROUND OF THE INVENTION

1. Technical Field

The present invention relates to woodworking machine and, more particularly, to an all-directional profiling machine.

2. Description of Related Art

With DIY popularity on the rise, DIY players purchase mini woodworking machines to make wooden furniture, including desks, chairs, cabinets, and boxes, by themselves. The prior art requires using a woodworking machine to cut tenons and mortises out of workpieces to be coupled together and then fitting each tenon and a corresponding mortise together to assemble furniture.

A typical woodworking machine uses a clamp to fix a workpiece to a workbench and then cut the workpiece with a knife mounted on the woodworking machine. However, the knife can only undergo horizontal and vertical linear motions relative to the workpiece; hence, to cut an oblique surface out of the workpiece, it is necessary to adjust the angle of inclination of the workpiece appropriately and then fix the workpiece in place with a clamp. However, to cut a plurality of oblique surfaces out of the workpiece, it is necessary to mount and demount the workpiece repeatedly in order to adjust and obtain different required angles of inclination; as a result, not only is operation time-consuming and intricate, but the repetitious mounting and demounting of the workpiece is also likely to cause a deviation of the processing center of the workpiece, thereby reducing the precision of the processed workpiece greatly.

BRIEF SUMMARY OF THE INVENTION

It is an objective of the present invention to provide an all-directional profiling machine for performing a multi-angle profiling cutting process such that the processing of a plurality of oblique surfaces is quicker, simpler and more precise.

Another objective of the present invention is to provide an all-directional profiling machine capable of cutting at two ends of a workpiece quickly without demounting the workpiece.

In order to achieve the above and other objectives, the present invention provides an all-directional profiling machine, comprising:

a foundation;

a profiling device disposed on the foundation, the profiling device comprising a bottom board, a base pivotally disposed on the bottom board, a profiling component disposed on the base and sliding horizontally and vertically to undergo a profiling processing process, and an axle unit disposed at the profiling component and adapted to receive a processing tool, wherein the bottom board has a pivotal block, and the base has a turntable, allowing the turntable of the base and the pivotal block to be pivotally connected such that the base swings leftward and rightward at a same height relative to the bottom board, with the pivotal block and the turntable fastened together by a first fixing element, so as to fix the base in place after the swing;

an upright post disposed at an end of the profiling device and having a terminal portion extending upward; and a workbench having a bottom surface and a top surface which a workpiece rests on, with a connecting block disposed on the bottom surface of the workbench, allowing the connecting block of the workbench to be pivotally connected to the terminal portion of the upright post such that the workbench tilts vertically relative to the upright post, wherein the connecting block and the terminal portion are fastened together with a second fixing element, and thus the workbench is fixed in place when tilted.

The upright post is cylindrical. The junction of the terminal portion and the upright post expands outward to form a round cover. The round cover of the terminal portion fits around the upright post. Hence, the terminal portion swings leftward and rightward at the same height relative to the upright post. A third fixing element penetrates the round cover and presses against the upright post to fix the terminal portion in place after the workbench has swung.

DETAILED DESCRIPTION OF THE INVENTION

Referring to FIG. 1 through FIG. 4, the present invention provides an all-directional profiling machine 10 which essentially comprises a foundation 11, a profiling device 21, an upright post 31 and a workbench 41.

Figure 1:
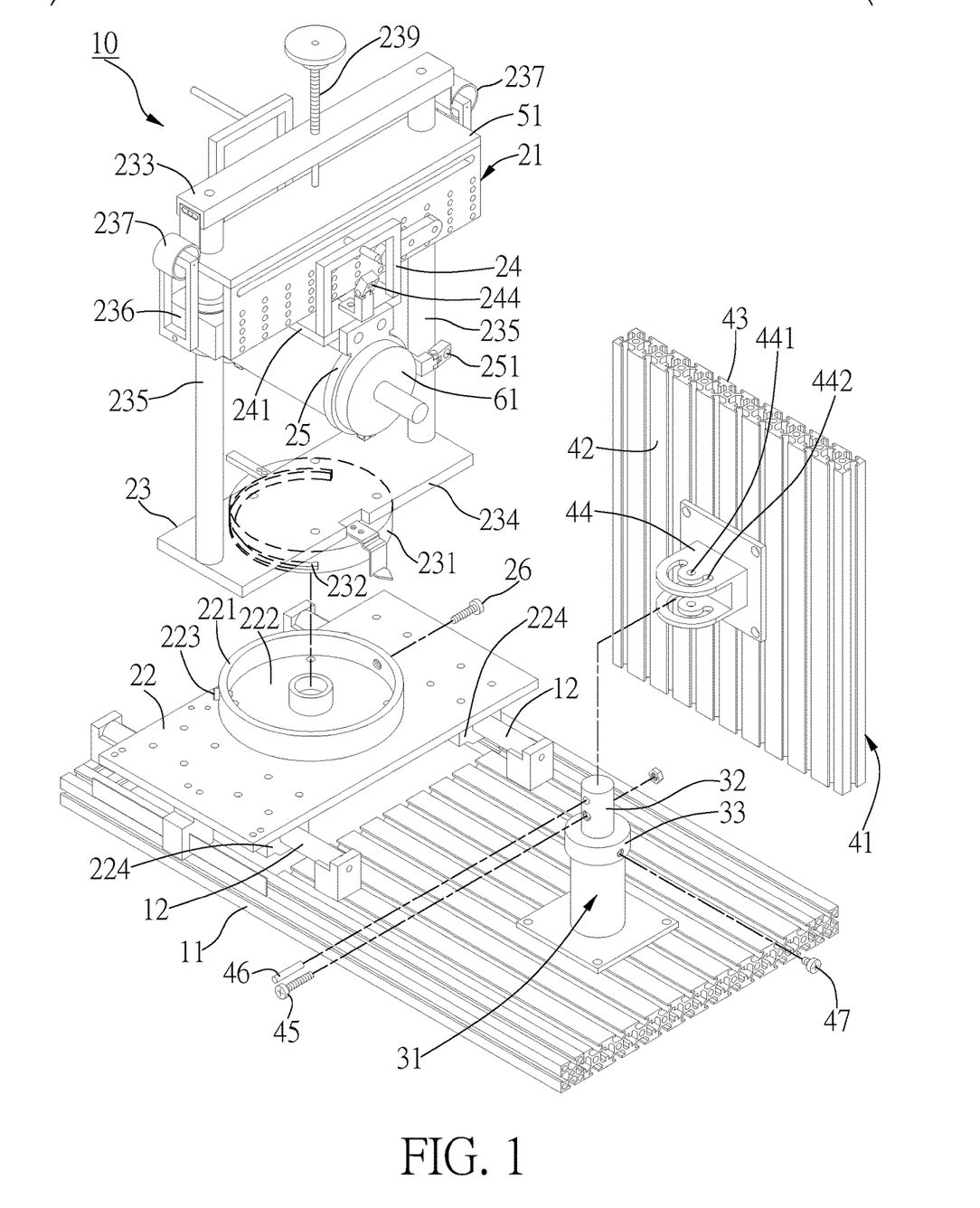
FIG. 1 is an exploded view of an all-directional profiling machine of the present invention.
Figure 2:
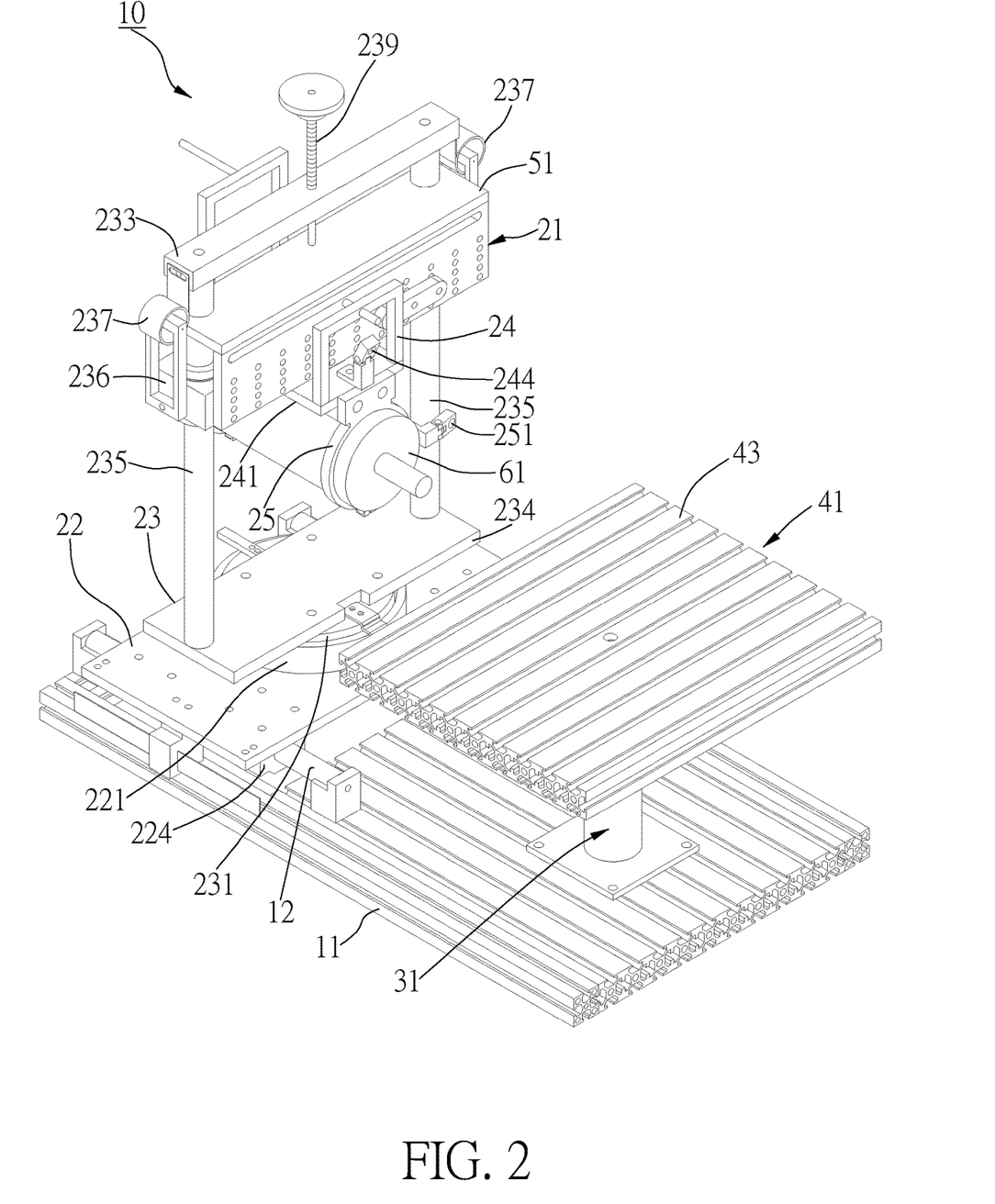
FIG. 2 is a perspective view of the all-directional profiling machine of the present invention.
Figure 3:
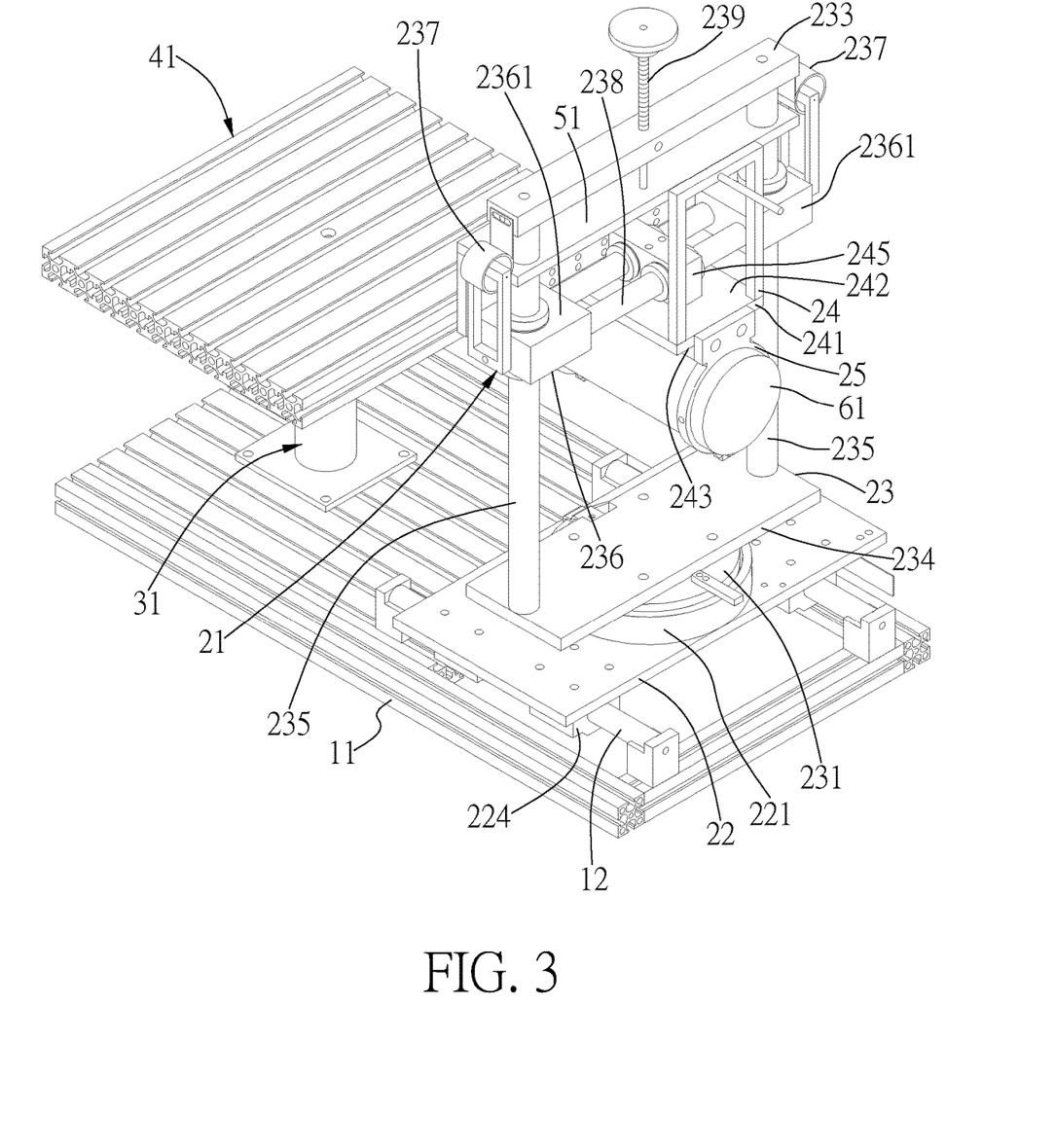
FIG. 3 is a perspective view of the all-directional profiling machine of the present invention from another angle.

The foundation 11 is planar and lies on the ground.

The profiling device 21 is disposed on the foundation 11. The profiling device 21 comprises a bottom board 22, a base 23 pivotally disposed on the bottom board 22, a profiling component 24 disposed on the base 23 and sliding horizontally and vertically, and an axle unit 25 disposed at the profiling component 24 and adapted to receive a processing tool 61. The bottom board 22 has a pivotal block 221. The base 23 has a turntable 231. The turntable 231 of the base 23 and the pivotal block 221 are pivotally connected; hence, the base 23 swings leftward and rightward at the same height relative to the bottom board 22, whereas the pivotal block 221 and the turntable 231 are fastened together with a first fixing element 26 (such as a screw) to fix the base 23 in place after the swing. In this embodiment, the pivotal block 221 is a hollow-core cylinder with a receiving space 222. The turntable 231 is saucer-shaped and is received in the receiving space 222 such that the turntable 231 swings along the inner circumferential surface of the pivotal block 221. The first fixing element 26 penetrates the pivotal block 221 and presses against the turntable 231 such that the turntable 231 and the pivotal block 221 are fastened together, allowing the base 23 to be fixed in place after the swing. A circumferential groove 232 is disposed at the rim of the turntable 231. A limit pin 223 insertable into the circumferential groove 232 is disposed at the pivotal block 221 and corresponding in position to the circumferential groove 232; hence, while the turntable 231 is swinging relative to the pivotal block 221, the angle of the swing is restricted by the limit pin 223 inserted into the circumferential groove 232.

The base 23 has a top portion 233 and a bottom portion 234. The turntable 231 is disposed at the bottom portion 234. Two parallel, spaced-apart support rods 235 are disposed upright between the top portion 233 and the bottom portion 234 of the base 23. A sliding unit 236 is disposed at the two support rods 235 to slide vertically along the two support rods 235. The top portion 233 of the base 23 and the sliding unit 236 are connected by at least one elastic element 237 (such as a constant-force spring) whereby the sliding unit 236 produces an elastic restoring force while sliding vertically along the two support rods 235. The sliding unit 236 comprises two sliders 2361 and at least one sliding rod 238 horizontally connected between the two sliders 2361. A lifting screw 239 is vertically, penetratingly disposed on the top portion 233 of the base 23. The lifting screw 239 is connected to a template unit 51 disposed between the top portion 233 of the base 23 and the sliding unit 236. With its two edges, the template unit 51 is slidingly disposed at the two support rods 235. The lifting screw 239 drives the template unit 51 to move vertically along the two support rods 235.

Figure 4:
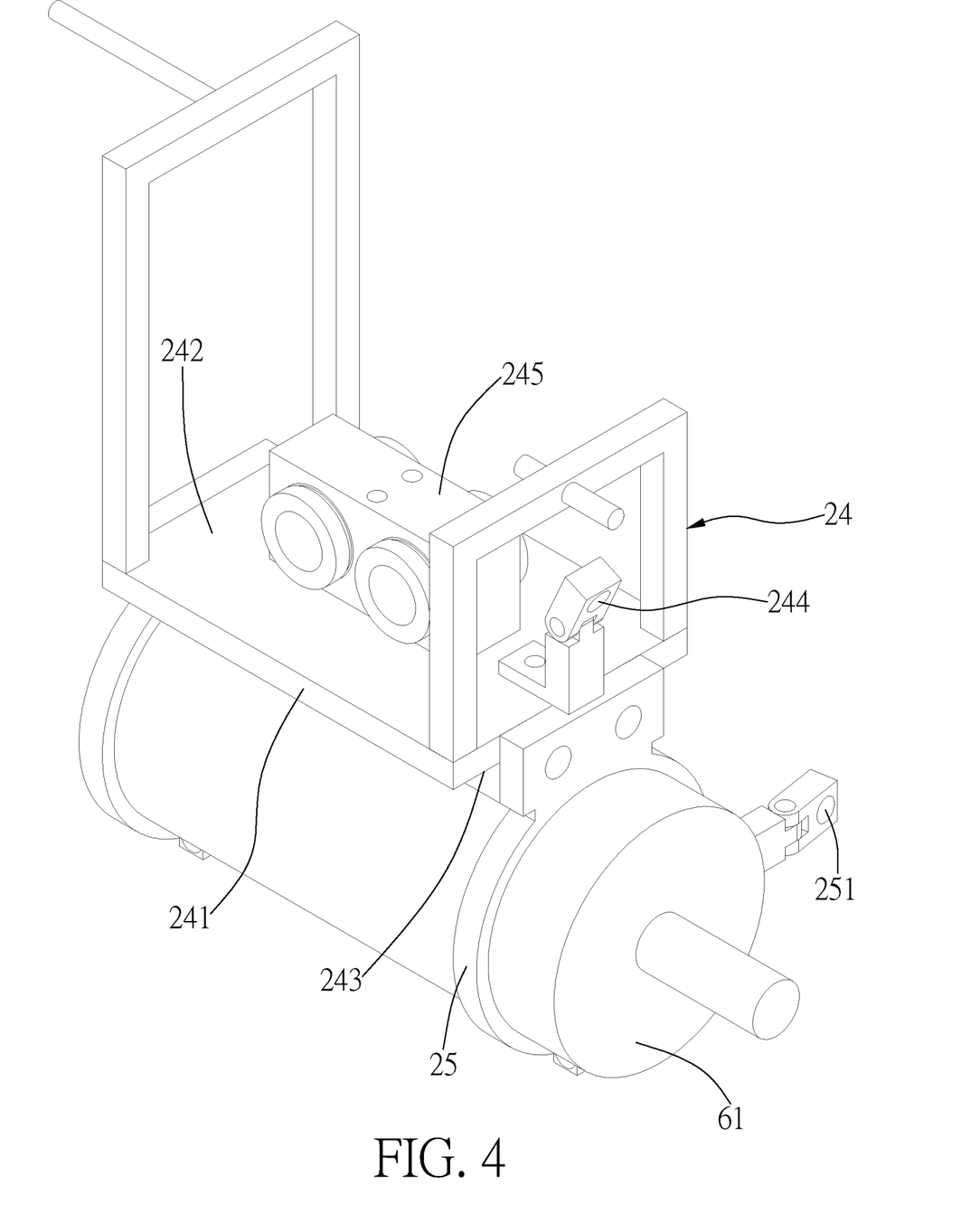
FIG. 4 is a schematic view of the structure of a profiling component according to the present invention.

Referring to FIG. 4, the profiling component 24 has a supporting board 241. The supporting board 241 has a top surface 242 and a bottom surface 243. The axle unit 25 is fixedly disposed on the bottom surface 243 of supporting board 234. Infrared aligners 244, 251 are disposed on the profiling component 24 and the axle unit 25, respectively. The two infrared aligners 244, 251 are spaced apart by an included angle of 90 degrees. A sliding-connecting portion 245 is fixedly disposed on the top surface 242 of the supporting board 241. With the sliding-connecting portion 245, the profiling component 24 is slidingly disposed on the sliding rod 238 such that not only does the profiling component 24 slide along the sliding rod 238 horizontally but the profiling component 24 also slides vertically together with the sliding unit 236 or slides horizontally along the sliding rod 238 to therefore synchronously drive the processing tool 61 mounted on the axle unit 25 to perform a profiling cutting process.

The upright post 31 is cylindrical, stands erect on the foundation 11, and lies at one end of the profiling device 21. The upright post 31 has a terminal portion 32 which extends upward. The junction of the terminal portion 32 and the other part of the upright post 31 expands outward to form a round cover 33. The round cover 33 of the terminal portion 32 fits around the upright post 31 such that the terminal portion 32 swings leftward and rightward at the same height along the outer rim of the upright post 31 relative to the upright post 31.

The workbench 41 has a bottom surface 42 and a top surface 43 which a workpiece rests on. A connecting block 44 is centrally disposed on the bottom surface 42 of the workbench 41. The connecting block 44 of the workbench 41 is pivotally connected to the terminal portion 32 of the upright post 31 such that the workbench 41 tilts vertically relative to the upright post 31. The connecting block 44 and the terminal portion 32 are fastened together with a second fixing element 45 (such as a screw), and thus the workbench 41 is fixed in place when tilted. In this embodiment, the connecting block 44 has a pivotal hole 441 and a U-shaped slot 442 below the pivotal hole 441. A shaft 46 penetrates the pivotal hole 441 and the terminal portion 32 of the upright post 31 such that the connecting block 44 is pivotally connected to the terminal portion 32 of the upright post 31. The second fixing element 45 is penetratingly disposed on the terminal portion 32 through the U-shaped slot 442 to fasten the connecting block 44 and the terminal portion 32 together, allowing the workbench 41 to be fixed in place when tilted. The connecting block 44 of the workbench 41 is connected to the terminal portion 32 such that the workbench 41 swings leftward and rightward synchronously with the terminal portion 32 to effect adjustments. A third fixing element 47 (such as a screw) penetrates the round cover 33 and presses against the upright post 31 to fix the workbench 41 in place when swung.

The foundation 11 has thereon a pair of rails 12 extending in the direction of the upright post 31. The bottom board 22 of the profiling device 21 has a plurality of sliders 224. The sliders 224 of the profiling device 21 slide along the rails 12 of the foundation 11, respectively, such that the profiling device 21 undergoes a forward-backward, positional adjustment along the rails 12.

Figure 5:
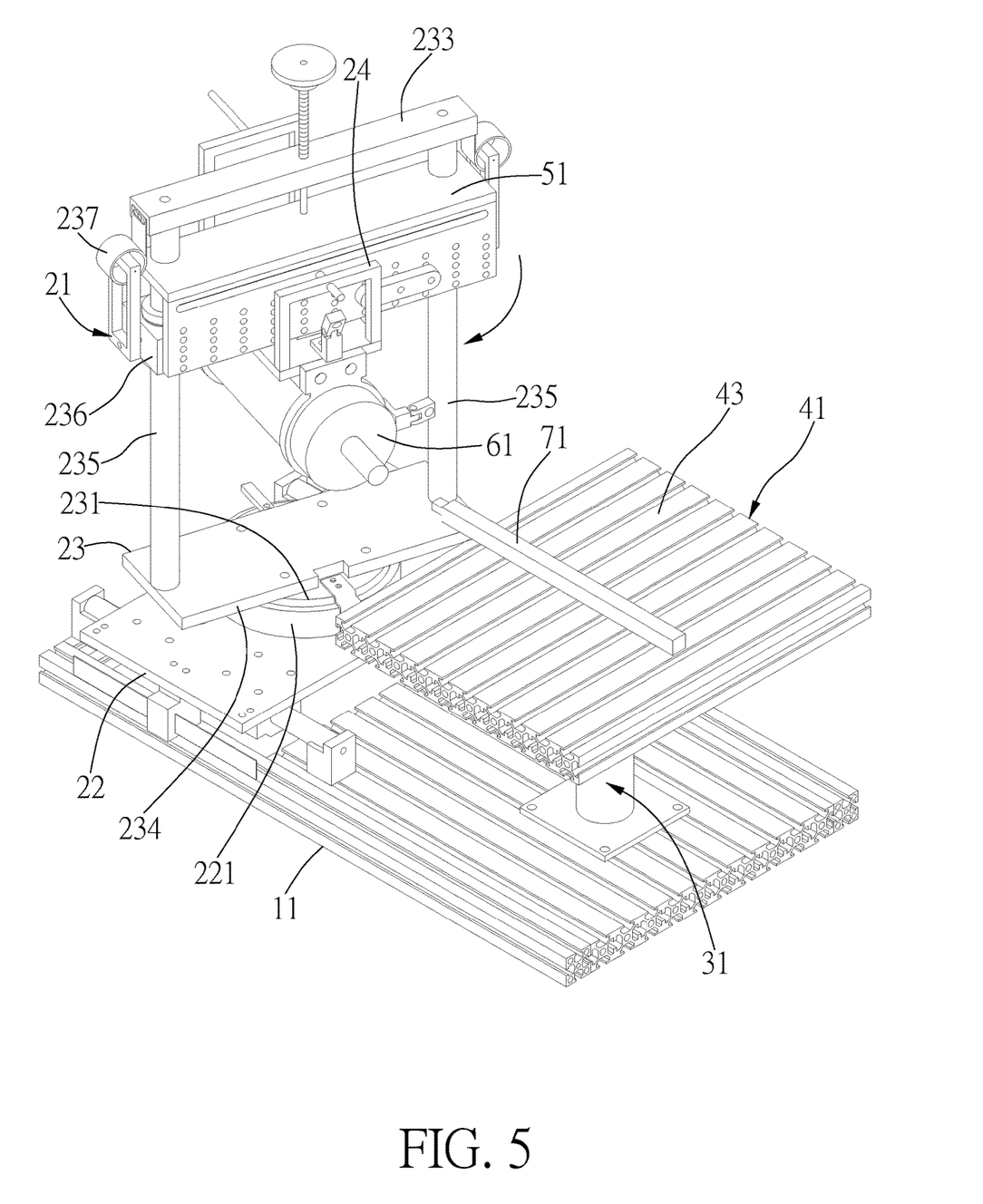
FIG. 5 is a schematic view of the operation of the all-directional profiling machine of the present invention, showing a profiling device swinging.
Figure 6:
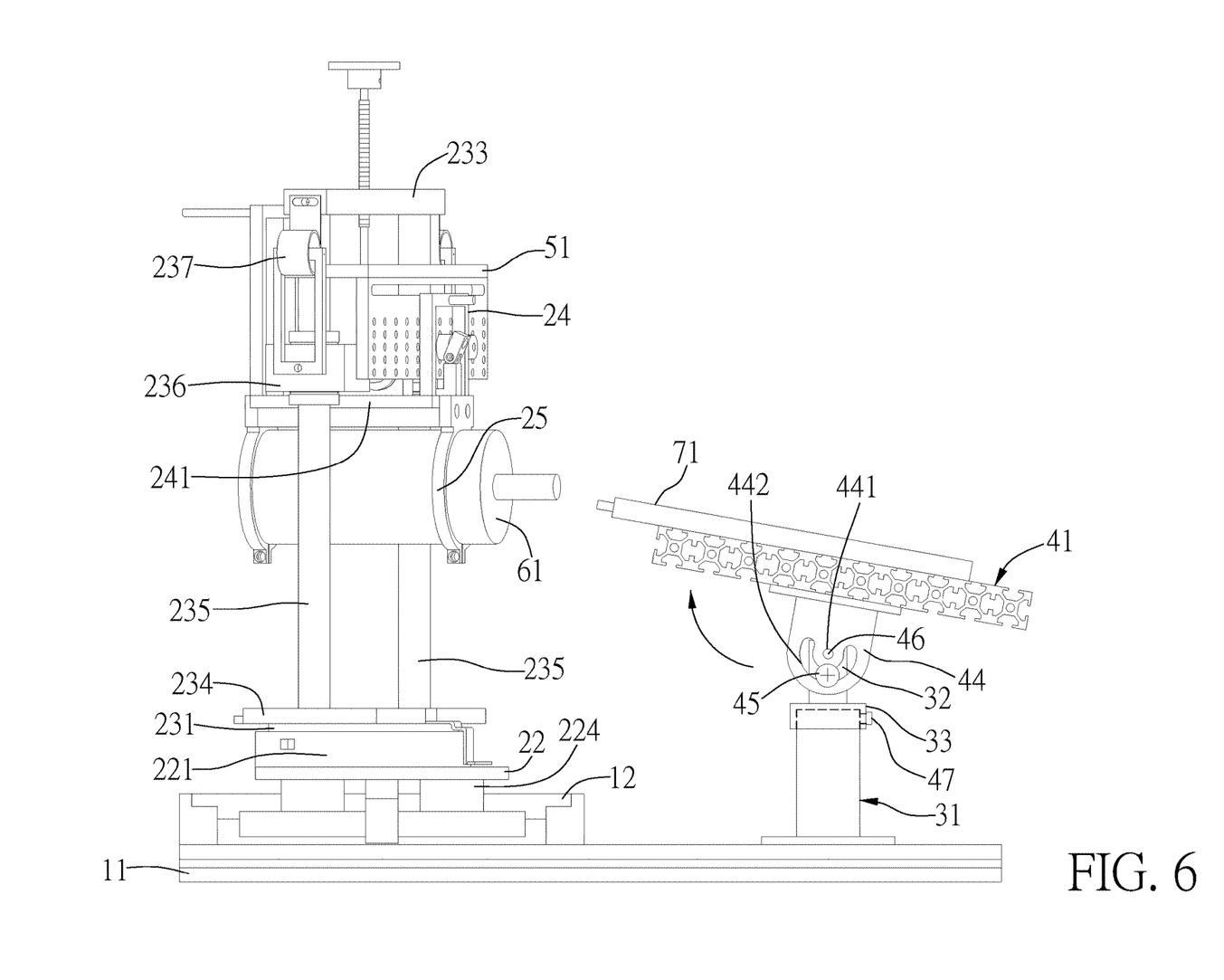
FIG. 6 is a schematic view of the operation of the all-directional profiling machine of the present invention, showing a workbench tilting.

The practical applications of the all-directional profiling machine 10 defined by the aforesaid structural features are illustrated by FIGS. 5, 6. As shown in the diagrams, a workpiece 71 is fixed to the top surface 43 of the workbench 41 with a clamp and a baffle (not shown). Afterward, a user adjusts the swinging angle of the base 23 and the tilting angle of the workbench 41 according to a cutting angle required for processing, then fixes the included angle between the base 23 and the workbench 41 with the first fixing element 26 and the second fixing element 45, respectively, and finally performs a profiling cutting process on the workpiece 71. To cut a plurality of oblique surfaces out of the workpiece, the user only needs to adjust the swinging angle of the base 23 and the tilting angle of the workbench 41 once again and thereby performs a multi-angle profiling cutting process without demounting the workpiece 71 repeatedly. Since the processing of a plurality of oblique surfaces is quicker, simpler and more precise according to the present invention, the present invention not only meets various requirements of different processing angles but also features enhanced processing efficiency.

Upon completion of the adjustment of the swinging angle of the base 23 and the tilting angle of the workbench 41, the heights of the infrared aligners 244, 251 mounted on the profiling component 24 and the axle unit 25 are adjusted with the lifting screw 239 such that light beams emitted from the two infrared aligners 244, 251 and crossed by each other calibrate the center of the workpiece 71, so as to ensure the precision of the subsequent profiling cutting process.

Figure 7:
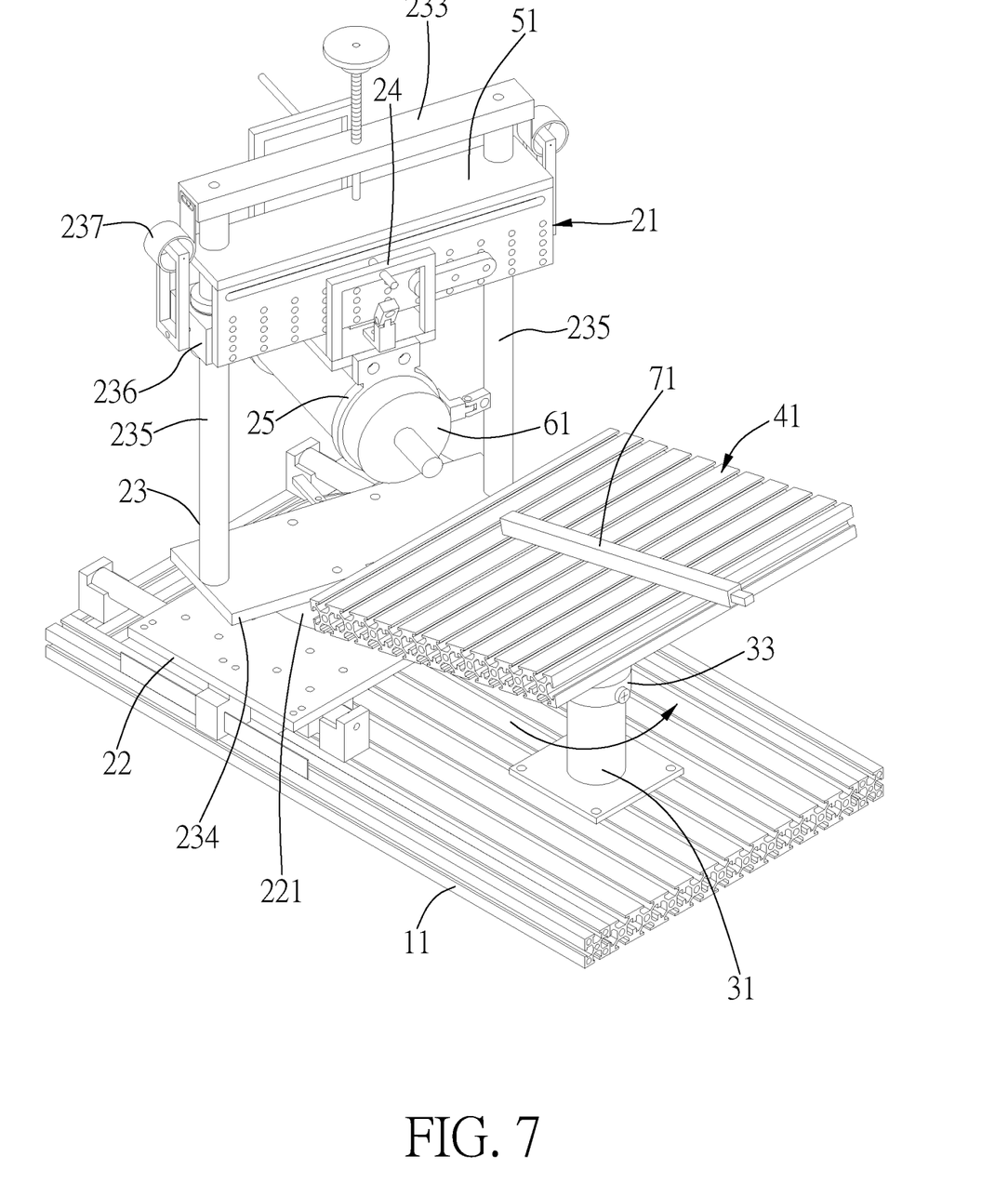
FIG. 7 is a schematic view of the operation of the all-directional profiling machine of the present invention, showing the workbench swinging.

Referring to FIG. 7, the workbench 41 is capable of swinging leftward and rightward at the same height. Therefore, if both of the two ends of the workpiece 71 need to undergo a cutting processing process, the all-directional profiling machine 10 may perform the cutting processing process at one of the two ends first and then swing the workbench 41 horizontally by 180 degrees such that the workpiece 71 takes an about-face. Afterward, the profiling device 21 moves along the rails 12 to adjust the processing positions of the processing tool 61 and the workpiece 71 before another cutting processing process is performed at the other end of the workpiece 71. Therefore, the all-directional profiling machine 10 is capable of performing profiling cutting processes at two ends of the workpiece 71 quickly without demounting the workpiece 71. Furthermore, by dispensing with the need to demount the workpiece 71, it is impossible for the processing center of the workpiece 71 to deviate.

What is claimed is:

1. An all-directional profiling machine, comprising:
a foundation;
a profiling device disposed on the foundation, the profiling device comprising a bottom board, a base pivotally disposed on the bottom board, a profiling component disposed on the base and sliding horizontally and vertically to undergo a profiling processing process, and an axle unit disposed at the profiling component and adapted to receive a processing tool, wherein the bottom board has a pivotal block, and the base has a turntable, allowing the turntable of the base and the pivotal block to be pivotally connected such that the base swings leftward and rightward at a same height relative to the bottom board, with the pivotal block and the turntable fastened together by a first fixing element, so as to fix the base in place after the swing;
an upright post disposed at an end of the profiling device and having a terminal portion extending upward; and
a workbench having a bottom surface and a top surface which a workpiece rests on, with a connecting block disposed on the bottom surface of the workbench, allowing the connecting block of the workbench to be pivotally connected to the terminal portion of the upright post such that the workbench tilts vertically relative to the upright post, wherein the connecting block and the terminal portion are fastened together with a second fixing element, and thus the workbench is fixed in place when tilted;
wherein the base has a top portion and a bottom portion, with the turntable disposed at the bottom portion, allowing two support rods to be disposed upright between the top portion and the bottom portion, with a sliding unit disposed at the two support rods to slide vertically along the two support rods and comprising two sliders and at least a sliding rod horizontally connected between the two sliders, the two support rods being parallel and spaced apart, and
wherein the profiling component has a supporting board having a top surface and a bottom surface, with a sliding-connecting portion disposed on the top surface of the supporting board, such that the profiling component is slidingly disposed on the sliding rod because of the sliding-connecting portion, thereby allowing the profiling component to slide horizontally along the sliding rod.

2. The all-directional profiling machine of claim 1, wherein the foundation has thereon a pair of rails extending in a direction of the upright post, and the bottom board of the profiling device has a plurality of sliders, such that the sliders of the profiling device slide along the rails of the foundation.

3. The all-directional profiling machine of claim 1, wherein the top portion of the base and the sliding unit are connected by at least an elastic element.

4. The all-directional profiling machine of claim 1, wherein the axle unit is disposed on the bottom surface of the supporting board, with infrared aligners disposed on the profiling component and the axle unit, respectively, and spaced apart by an included angle of 90 degrees.

5. The all-directional profiling machine of claim 1, wherein the pivotal block is a hollow-core cylinder with a receiving space, whereas the turntable is saucer-shaped and is received in the receiving space, such that the first fixing element penetrates the pivotal block and presses against the turntable to fasten the turntable and the pivotal block together.

6. The all-directional profiling machine of claim 1, wherein the connecting block has a pivotal hole and a U-shaped slot below the pivotal hole, whereas a shaft penetrates the pivotal hole and the terminal portion of the upright post such that the connecting block is pivotally connected to the terminal portion of the upright post, with the second fixing element penetratingly disposed on the terminal portion through the U-shaped slot to fasten the connecting block and the terminal portion together.

7. The all-directional profiling machine of claim 6, wherein the upright post is cylindrical, with a round cover disposed at a junction of the terminal portion and the upright post, allowing the round cover of the terminal portion to fit around the upright post such that the terminal portion swings leftward and rightward at a same height relative to the upright post, and a third fixing element penetrates the round cover and presses against the upright post to fix the terminal portion in place after the workbench has swung.

* * * * *